US 6,575,287 B2

(12) United States Patent
Garvey et al.

(10) Patent No.: US 6,575,287 B2
(45) Date of Patent: Jun. 10, 2003

(54) PRODUCT CONVEYING AND ACCUMULATION SYSTEM AND METHOD

(75) Inventors: Mark C. Garvey, 19 Beebetown Rd., Hammonton, NJ (US) 08037; William J. Fox, Williamstown, NJ (US)

(73) Assignee: Mark C. Garvey, Blue Anchor, NJ (US)

( * ) Notice: Subject to any disclaimer, the term of this patent is extended or adjusted under 35 U.S.C. 154(b) by 0 days.

(21) Appl. No.: 09/984,682

(22) Filed: Oct. 25, 2001

(65) Prior Publication Data

US 2003/0079960 A1 May 1, 2003

(51) Int. Cl.⁷ .................. B65G 47/30; B65G 47/12; B65G 47/26; B65G 47/68; B65G 37/00
(52) U.S. Cl. .................. 198/418.6; 198/445; 198/452; 198/580
(58) Field of Search .................. 198/418.6, 445, 198/452, 456, 580

(56) References Cited

U.S. PATENT DOCUMENTS

| | | |
|---|---|---|
| 2,763,359 A | 9/1956 | Rose |
| 3,104,753 A | 9/1963 | Osborne |
| 3,353,651 A | 11/1967 | Witmer |
| 3,506,110 A | 4/1970 | Paul et al. |
| 3,604,551 A | 9/1971 | Fink |
| 4,003,466 A | 1/1977 | Muth et al. |
| 4,037,710 A | 7/1977 | Brutcher |
| 4,401,207 A | 8/1983 | Garvey |
| 4,925,003 A | 5/1990 | Limoni |
| 5,267,821 A | 12/1993 | Bodart et al. |
| 5,275,271 A | 1/1994 | Endo et al. |
| 5,282,525 A | 2/1994 | Covert |
| 5,551,551 A | 9/1996 | Crawford |
| 5,673,783 A * | 10/1997 | Radant et al. ....... 198/418.6 X |
| 6,168,005 B1 | 1/2001 | Petrovic |

* cited by examiner

Primary Examiner—Christopher P. Ellis
Assistant Examiner—Gene O. Crawford
(74) Attorney, Agent, or Firm—Stuart M. Goldstein (57) ABSTRACT

A product conveying and accumulation system is provided for use with products of various sizes, shapes, and stability characteristics. The system comprises multiple moving conveyors, including a first conveyor which transports product from an upstream location. This same conveyor or another conveyor delivers product to a downstream location. An accumulator conveyor, traveling at a substantially similar speed or a designated variable speed as the first conveyor or conveyors, is aligned in the same plane as, is adjacent to, and may mate with the first conveyor at a predetermined location for contiguous movement in the same direction as the first conveyor at this predetermined location. A product guide is provided which allows for the movement of product from the upstream to downstream locations during normal operation and directs product to the accumulator section of the second conveyor when there is a disruption or malfunction downstream. Any product which cannot be accepted downstream is thus accumulated in a designated area and such products are re-circulated to that area and ultimately to the downstream location when the downstream disruption or malfunction is remedied.

37 Claims, 8 Drawing Sheets

PRODUCT CONVEYING AND ACCUMULATION SYSTEM AND METHOD

BACKGROUND OF THE INVENTION

Product accumulation systems are routinely used in conjunction with conveyors for the storage and accumulation of product which is fed from an upstream source onto conveyors. In the normal operation of this type system, product is placed on a conveyor at the upstream location, for instance at one operational station, and then transported to a downstream location by conveyor where the next step in the manufacture or distribution of the product is to be accomplished.

It is not uncommon that, during this process, there may be a disruption at a downstream location caused by a malfunction of machinery, some constraining problem, or other circumstance which prevents downstream machine from accepting products. Continued operation of production upstream may result in the build-up of line back pressure which could cause a further problem in permitting the unrestricted movement of product. However, if such a disruption is one which can be addressed relatively quickly, upstream product which normally would be transported to the malfunctioning location, can be received and temporarily stored by an accumulator which is integral to the system.

By employing such an accumulator, the upstream machinery can continue to operate by moving product to the accumulator. Since product movement can continue, there is no build-up of line pressure. Such a system also saves the substantial time and expense which would result in having to shutdown and then restart the entire system, if no accumulator was otherwise available.

As product is being received and retained by the accumulator, the downstream problem can be addressed. When that part of the system resumes full operation, the products stored in the accumulator are released to the downstream destination, with little downtime to the system. Products can also be received and stored at the accumulator in case there is an upstream disruption. In this case, accumulated products could be retained and sent downstream in order to keep the system operational while the upstream problem is being remedied.

There are several types of commonly used accumulator systems which perform the above described functions. However, these systems have significant disadvantages. One such system is an inline conveyor, which allows product to build up either in single file or en masse in front of the constraining operation. If the product is stored in single file, the amount of storage is minimal and the build-up of line pressure can be problematic for the downstream machinery, as well as the product, due to damage. If product is stored inline and en masse, the amount of storage is increased, however, the line pressure increases as well and the added requirement of putting the product back into single file is required. This creates the possibility of lost production due to jamming in the single filer.

A second type is offline storage. These devices store excess products at right angles to the line in mass. As product backs up on the production line, the storage device will allow product flood out onto the planar surface, which is powered away from the line during the period of accumulation. When the stored product is called for, the planar surface reverses direction and the stored product is loaded back onto the production line. This is almost always done in mass and therefore has the same inherent problems with line pressure and single filing requirements as inline storage devices.

A third type uses re-circulating storage. This type of storage device allows products to travel directly from the entry point to the exit point without interrupting the flow, until a need to store product occurs. When it does, product is re-circulated by means of two planar surfaces moving in opposite directions. Product that cannot exit the storage device is allowed to re-circulate onto the planar surface, moving in the direction which is opposite to the direction of discharge. This technique has been very effective in minimizing the amount of line pressure that can build up, as well as incorporating within the device the inherent ability to single file without a separate device to perform this function. However, due to the planar surfaces being adjacent to each other and the requirement that the product reverse direction at either end of the storage device, there are limitations to the size shape and speed of the product which can be stored on such a device. Product instability limits the application of these devices. Another factor, which limits the use of these devices is the noise and label damage generated by product-to-product contact during the re-circulating process. Products such as larger glass containers and the like create noise levels which are not acceptable in normal production environments.

SUMMARY OF THE INVENTION

It is thus the object of the present invention to overcome the limitations and disadvantages of prior product conveying and accumulation systems.

It is an object of the present invention to provide a product conveying and accumulation system and method which allows products to be received, stored, and accumulated during the production process, thereby efficiently and effectively reducing the adverse affects of downstream and upstream disruptions, including machine malfunctions, on the output of the production process.

It is a further object of the present invention to provide a product conveying and accumulation system and method in which products of various sizes and shapes have the ability to re-circulate in a system, so as to minimize the build-up of line pressure.

It is still a further object of the present invention to provide a product conveying and accumulation system and method which provides the ability to single file or feed multiple output lanes in single file, or en masse, at speeds much faster than had previously been available, due to the unique re-circulating capacity of the system.

It is another object of the present invention to provide a product conveying and accumulation system and method which allows product unable to be accumulated by prior systems because of the product's physical instability, to be effectively received, stored, and accumulated without damage to or disruption of the product's movement, thereby increasing the overall output of the entire production process.

It is still another object of the present invention to provide a product conveying and accumulation system and method which reduces the noise levels while conveying and accumulating during the production process.

It is a further object of the present invention to provide a product conveying and accumulation system and method which reduces product contact during product movement and results in subsequent reduction to product damage and product labeling.

These and other objects are accomplished by the present invention which consists of a product conveying and accumulation system for use with products of various sizes, shapes and stability characteristics. The system comprises multiple moving conveyors, including a first conveyor which transports product from an upstream location. This same conveyor or another conveyor delivers product to a downstream location. An accumulator conveyor, traveling at a substantially similar speed or a designated variable speed as the first conveyor or conveyors, is aligned in the same plane as, is adjacent to, and may mate with the first conveyor at a predetermined location for contiguous movement in the same direction as the first conveyor at this predetermined location. A product guide is provided which allows for the movement of product from the upstream to downstream locations during normal operation and directs product to the accumulator section of the second conveyor when there is a disruption or malfunction downstream. Any product which cannot be accepted downstream is thus accumulated in a designated area and such products are re-circulated to that area and ultimately to the downstream location when the downstream disruption or malfunction is remedied.

Product enters the accumulator and its recirculating conveyor either in single file or in multiple rows either aligned or nested or en masse. Product can be discharged in single file, en masse, or in divided rows, whatever the application requires.

The conveying and accumulation system disclosed by the present invention permits product which is inherently unstable, e.g., lightweight, but top heavy plastic containers with a high center of gravity, to be received, accumulated, and re-circulated, without such product tipping, falling over, and thus disrupting the accumulation and re-circulation process. The configuration of the various conveying elements of the system maintains these products in their upright position throughout the accumulation and re-circulation process.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
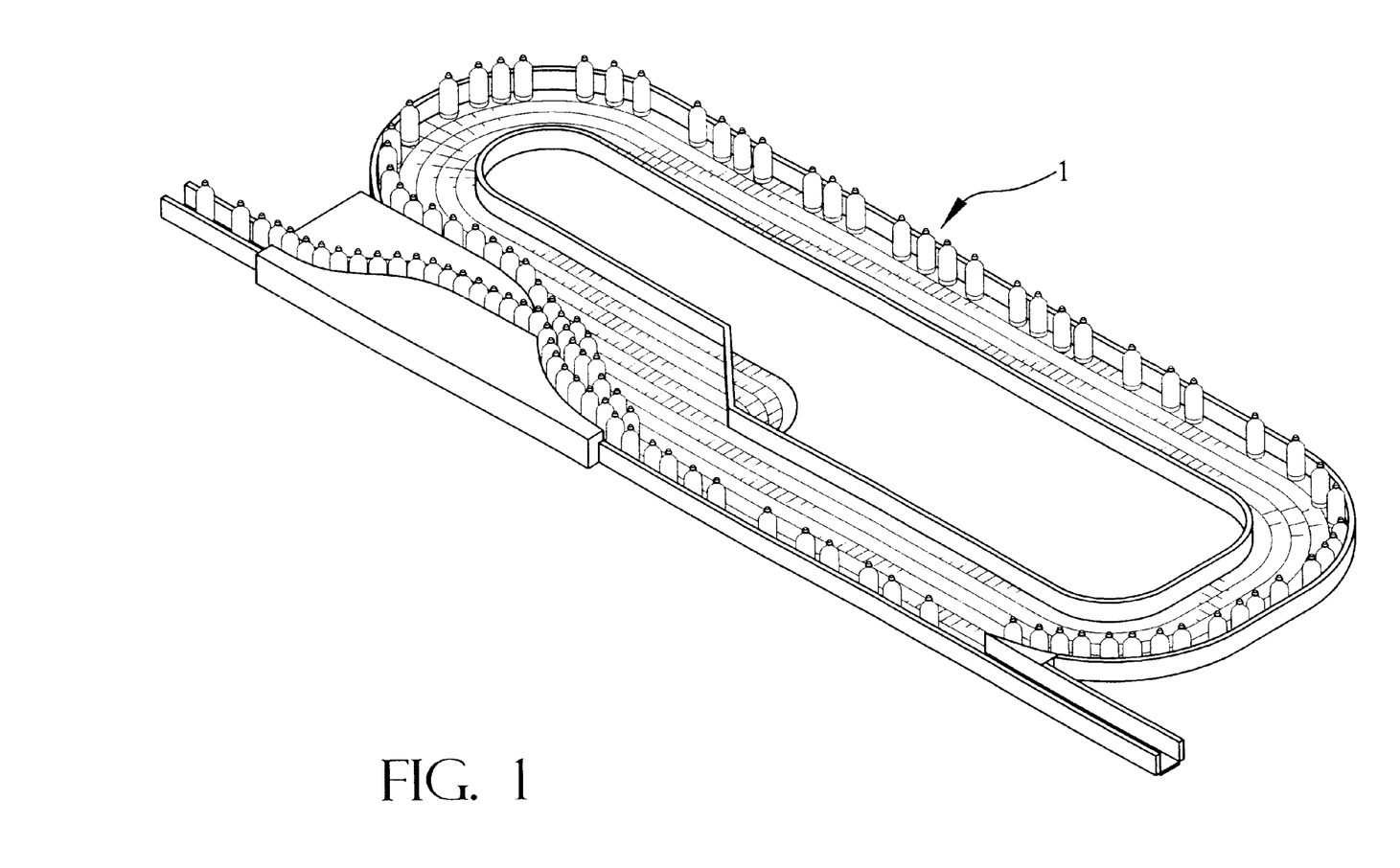
FIG. 1 is a perspective depiction of the product conveying and accumulation system of the present invention.
Figure 2:
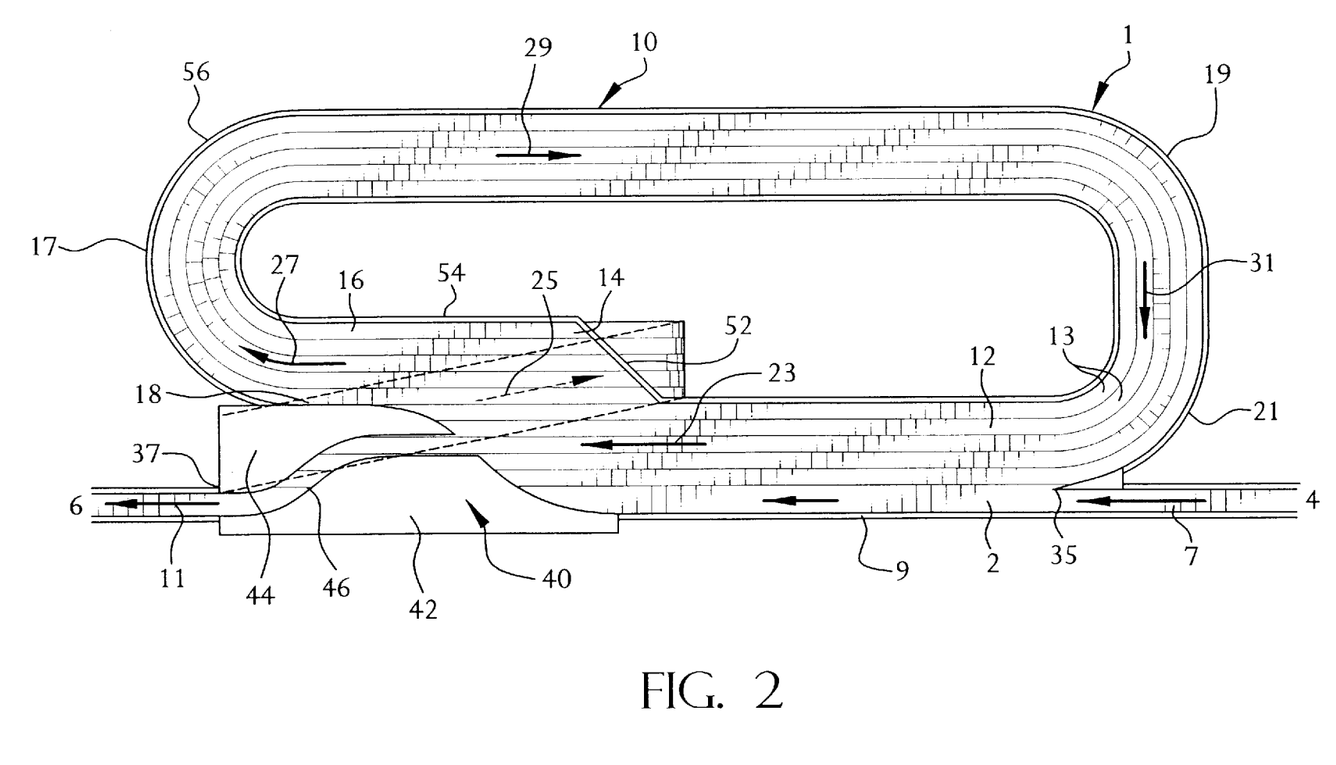
FIG. 2 is a top view of the product conveying and accumulation system of the present invention, showing the directional movement of components in the system.

The product conveying and accumulation system 1 of the present invention comprises conveyor 2 which is configured to move product, such as bottles 100, from an upstream location or station designated as 4, to a downstream location or station designated as 6. Conveyor 2 moves in the direction indicated by directional arrows 7, 9 and 11, and is set to travel at a predetermined speed.

Conveyor/accumulator 10 consists of a conveyor 12 which may be constructed of interlocked segments 13 which are well known in the industry. Conveyor 12 comprises accumulator section 14, and a recirculating section 16 which extends from accumulator section 14, through turn sections 17, 19 and 21. All of these sections make up a single, continuous conveyor path, which is completed by section 18 of conveyor 12. Section 18 is positioned underneath and wraps down and then up to accumulator section 14. The direction of travel of conveyor 12 is depicted by directional arrows 23, 25, 27, 29 and 31.

Both conveyor 2 and conveyor 12 are powered for linear movement by well-known drive means from a motor or other suitable power source.

Conveyor 12 can be set to travel at a speed which is substantially similar to the speed of conveyor 2, when the entire system is operational, or at a variable speed, depending on the characteristic nature of the product and the speed at which product is being delivered from upstream and supplied downstream. For instance, when handling inherently unstable product, e.g. empty lightweight plastic containers, it has been found that in order to maintain such product in their upright positions, the conveyors can be operated at identical speeds. However, optimal performance for such product appears to be obtained by varying conveyor speeds only slightly. For products which are heavier and thus more stable, conveyor speeds are more dependent upon the supply of product to the accumulator system and the downstream demand.

Conveyor/accumulator 10 and its conveyor 12 are located in the same transverse plane as conveyor 2 and conveyor 12 is aligned adjacent to conveyor 2 between locations 35 and 37. In this configuration, conveyors 2 and 12 run adjacent to each other and move in the same direction between locations 35 and 37. It is contemplated that conveyor 2 and conveyor/accumulator 10 can also be mated as they move between locations 35 and 37, in a manner which is commonly employed in the industry. Upon mating at location 35, conveyor 2 and conveyor section 12 remain aligned adjacent to each other and, during system operation, move contiguously in the same direction while mated.

Whether mated with conveyor 12 or running adjacent to it, at location 37 conveyor 2 continues towards downstream station 6 in direction 11, while conveyor 12 travels beneath the system in direction 25 towards accumulator section 14 and ultimately in direction 27 toward recirculatory section 16.

Figure 5:
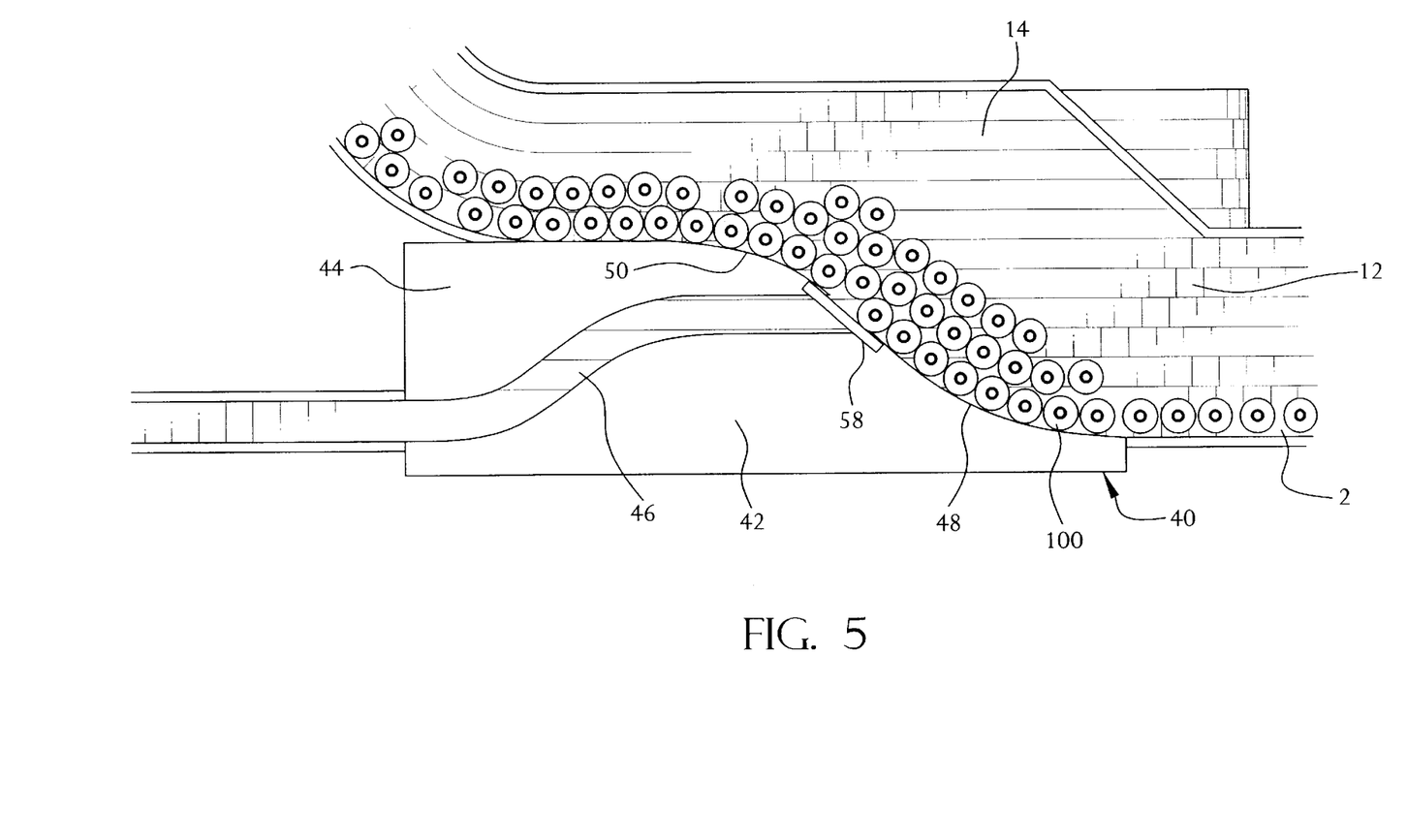
FIG. 5 is a close-up top view of the guide and accumulator sections of the present invention.

Guide 40 is designed to direct product being transported on conveyor 2 to its downstream location during normal operation and also to smoothly direct product to conveyor/accumulator 10, especially when there is a disruption and stoppage downstream. Guide 40, as shown, comprises two sections 42 and 44, defining channel 46. Section 42 is configured with a smooth curved outer surface 48 and section 44 is configured with smooth corresponding outer surface 50. Channel 46 also is configured as a curved passage adapted to accept, maintain, and move product smoothly down the line. Guide 40 surface configurations at all times assist in maintaining product, such as bottles 100, even product which is inherently unstable, in their upright positions, both when production is fully operational and conveyor 2 is carrying products downstream through guide 40, and when product is being directed over and around surfaces 48 and 50, toward accumulator section 14 and recirculating section 16.

Inside guide rail 52 assists in receiving and maintaining product, such as bottles 100, within accumulator section 14 in their upright positions. Inner guide rail 54, extending from guide rail 52, maintains the inner boundaries of recirculation section 16, while guide rail 56 serves to define the outer boundaries of the recirculation section.

Figure 3:
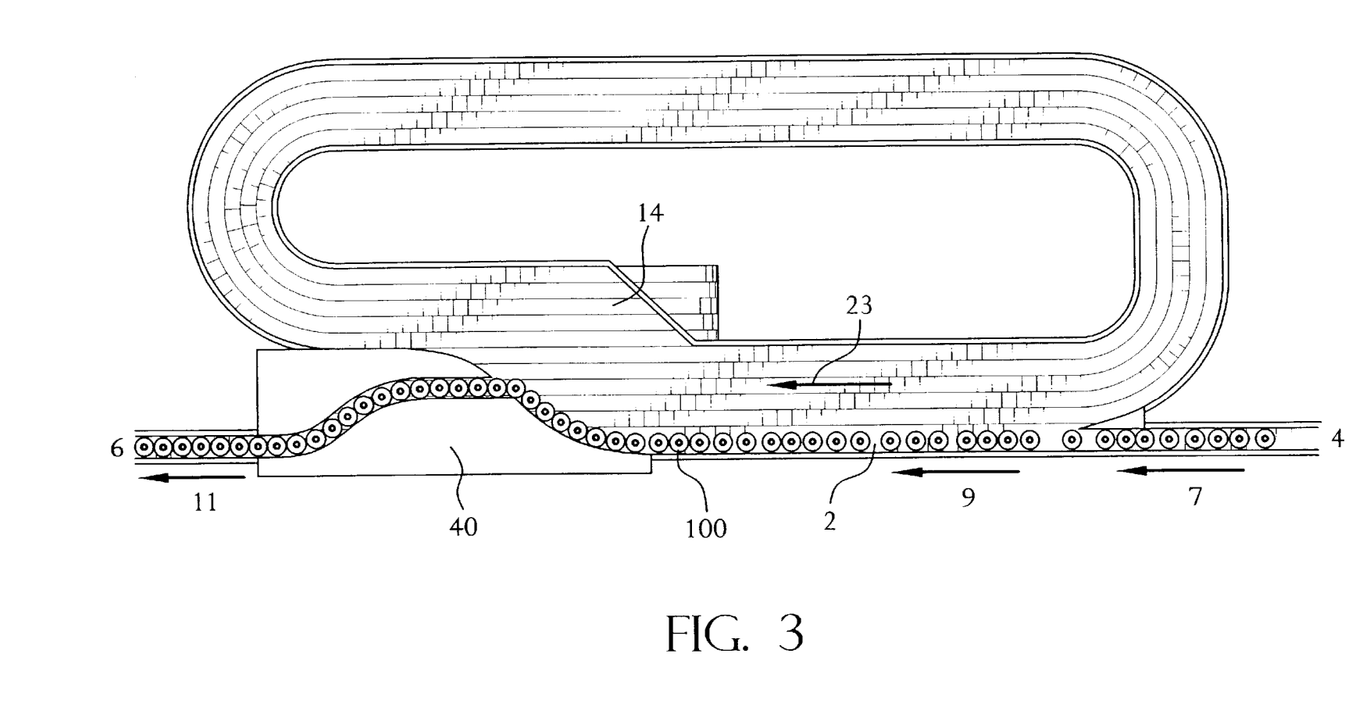
FIG. 3 is a top view of the product conveying and accumulation system of the present invention, showing normal upstream to downstream product movement.

In normal operation, that is when there is full production without disruption or constraint, conveyor 2 and conveyor/accumulator 10 are optimally set to run in tandem, at substantially similar or variable speeds, depending on the need, as discussed above. As seen in FIG. 3, product, such as bottles 100, are delivered from upstream station 4 and are moved by means of conveyor 2 through channel 46 of guide 40 to downstream station 6. Those bottles 100 which cannot be readily accepted by channel 46 are directed by guide surfaces 48 and 50 to conveyor/accumulator 10 and recirculating section 16, where the bottles are recirculated and returned to conveyor 2 for eventually transport to downstream station 6.

Figure 4:
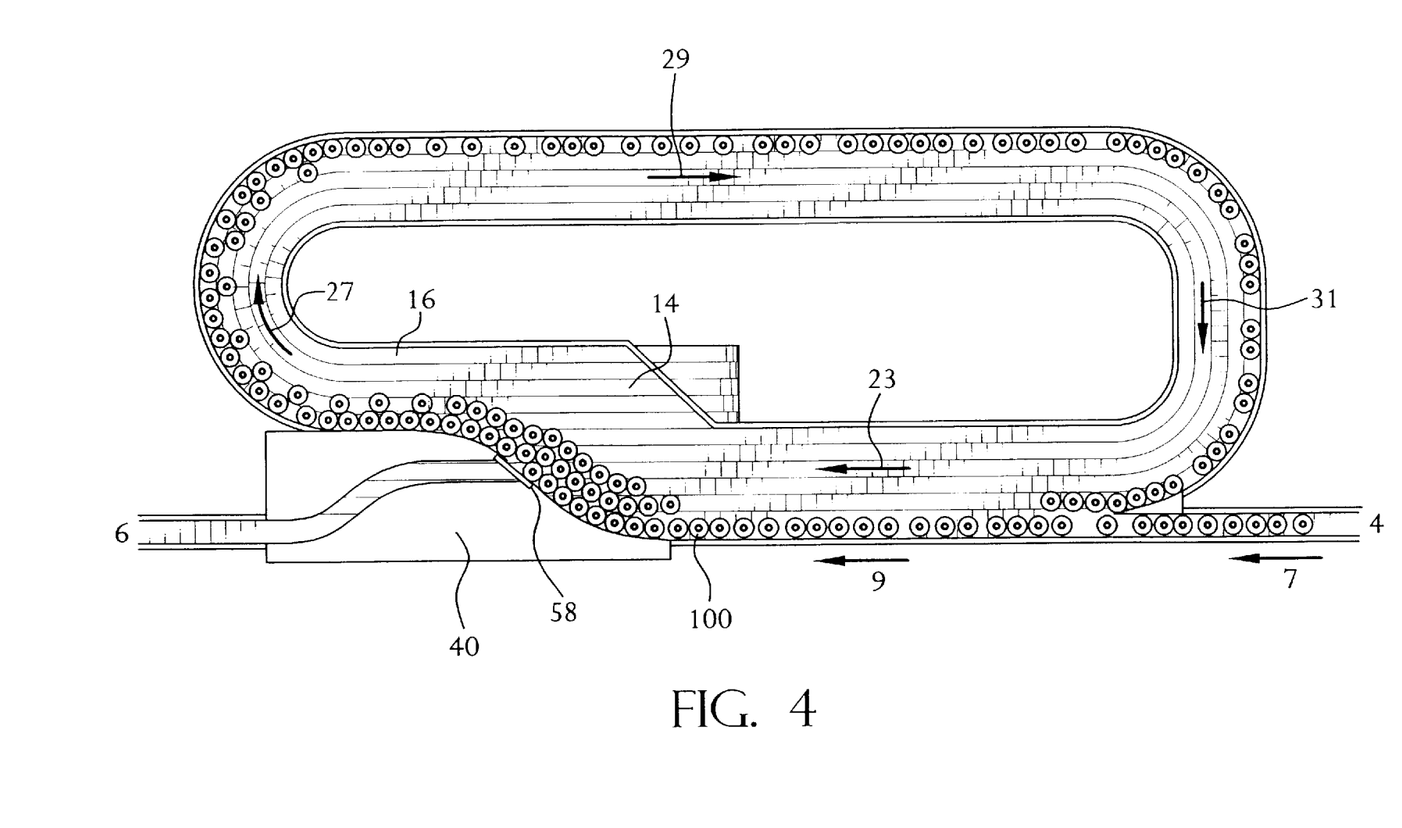
FIG. 4 is a top view of the product conveying and accumulation system of the present invention, showing product accumulating as a result of a downstream constraint.

When there is a disruption of production downstream, continued upstream production and transport of product would normally cause an unacceptable build-up of line pressure upstream. As a result, when there is a disruption, such as a complete stoppage or slowdown of the movement of product, in accordance with the present invention, the end of channel 46 is closed off, as shown in FIG. 4 at 58, but conveyor 2 continues to deliver bottles 100 from upstream station 4. Bottles 100 are then directed by guide surfaces 48 and 50 toward recirculatory section 16 of conveyor/accumulator 10, where they continue to be transported by conveyor 12 around the recirculating section. As more bottles 100 are fed from upstream, an increased number of bottles are located on recirculating section 16. Additional feeding of bottles 100 from upstream results in their being accumulated and stored within accumulator section 14, as shown in FIG. 5.

The speed at which the conveying and accumulation of the herein invention operates is coordinated with and calibrated to the rate of upstream product feed, such that product will accumulate sufficiently on conveyor/accumulator 10 during the time necessary to effect repairs or otherwise remedy the downstream disruption or constraint. Since most such circumstances can be addressed within a short period, upstream production can continue during this downtime.

After the disruption or stoppage of downstream production is addressed and remedied, channel 46 of guide 40 is reopened, allowing the continued flow of product to downstream station 6. As the conveyors in the system continue to operate, product located on conveyor/accumulator 10 will eventually be directed to channel 46 and proceed downstream. By this process, continued full production is maintained without interruption or the need to totally shut down operation.

An alternate operational use of system 1 allows for accumulation of product on conveyor/accumulator 10 sufficient to supply downstream station 6, should there be a disruption or breakdown of facilities upstream. While such upstream conditions are being investigated and addressed, product accumulated on conveyor/accumulator 10 can be feed downstream, again keeping production flowing with no interruption or shut-down.

As is common in the industry, the speed of the upstream product feed and downstream product supply are designed to be adjusted, depending on the type of product and the location of the constraint. For optimal operation, there should always be sufficient accumulated product in conveyor/accumulator 10, such that the upstream product feed is adjusted to equate to the downstream flow of the product.

The unique configuration of this system, including the design, configuration, use, and placement of the various conveyors operating in tandem and at substantially similar or variable speeds, effectively and efficiently moves, accumulates and at all times maintains the upright position of product, especially plastic containers, whose inherent high center of gravity causes them to be unstable and to easily tip and fall during unguided movement. Proper operation of the herein conveying and accumulation system will result in such product remaining upright, thus eliminating the downtime resulting from fallen product which causes disruption and often a stoppage of the system.

An additional benefit derived from conveying and accumulation system 1 is obtained by a reduction of noise level and product damage during system operation. Product which is moved on prior conveyor systems tend to contact each other, especially at turns in the conveyor. However, as products, like bottles 100, are moved on recirculation section 16, and especially at turns 17, 19, and 21, the constant speed at which conveyor 12 travels causes the outboard bottles to become spaced apart from the inboard bottles. This reduces product contact and its resulting noise, and also helps to eliminate product and product labeling damage caused by product to product contact.

Figure 6:
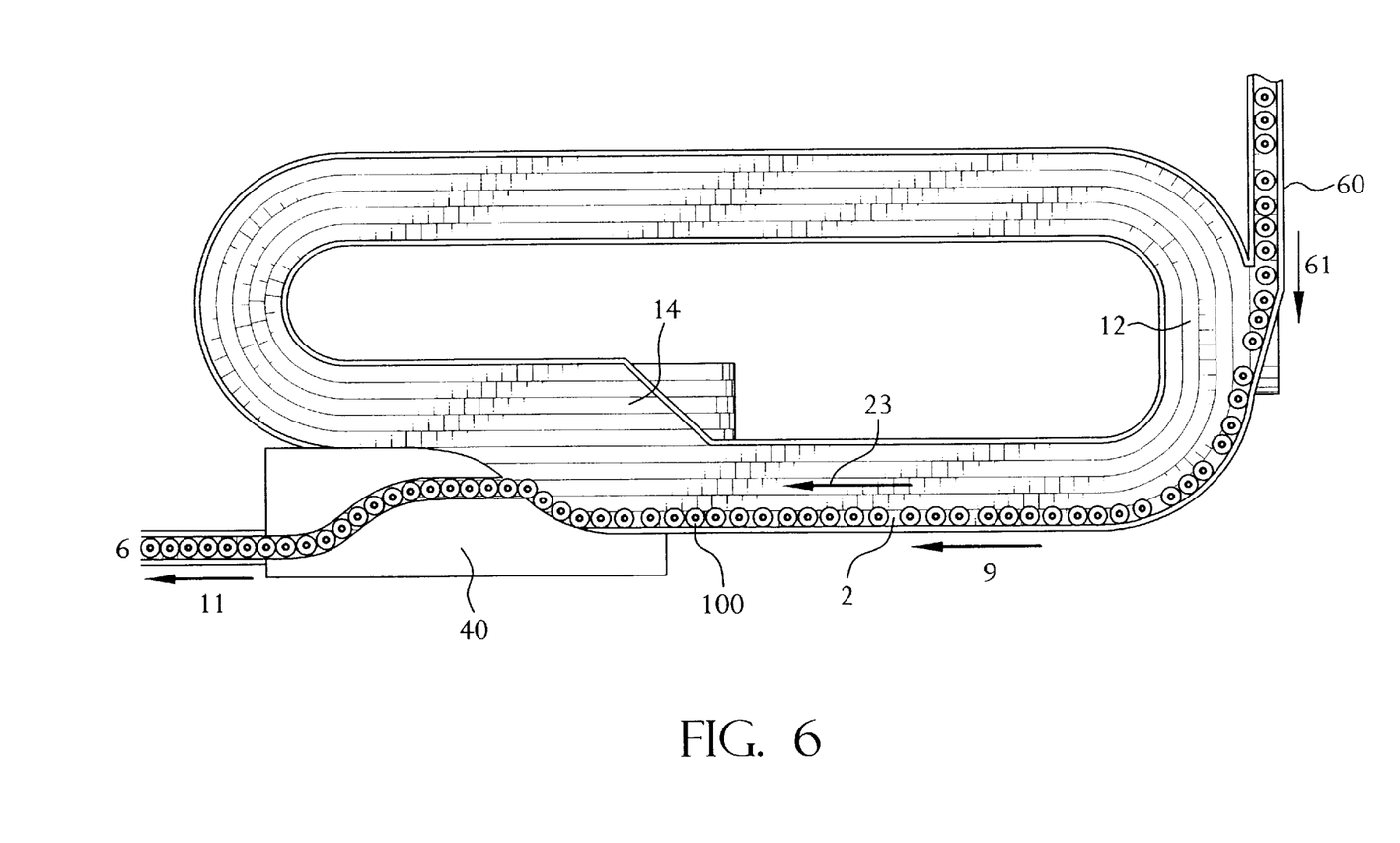
FIG. 6 is a top view of the product conveying and accumulation system of the present invention, showing an alternate embodiment for normal upstream to downstream product movement.
Figure 7:
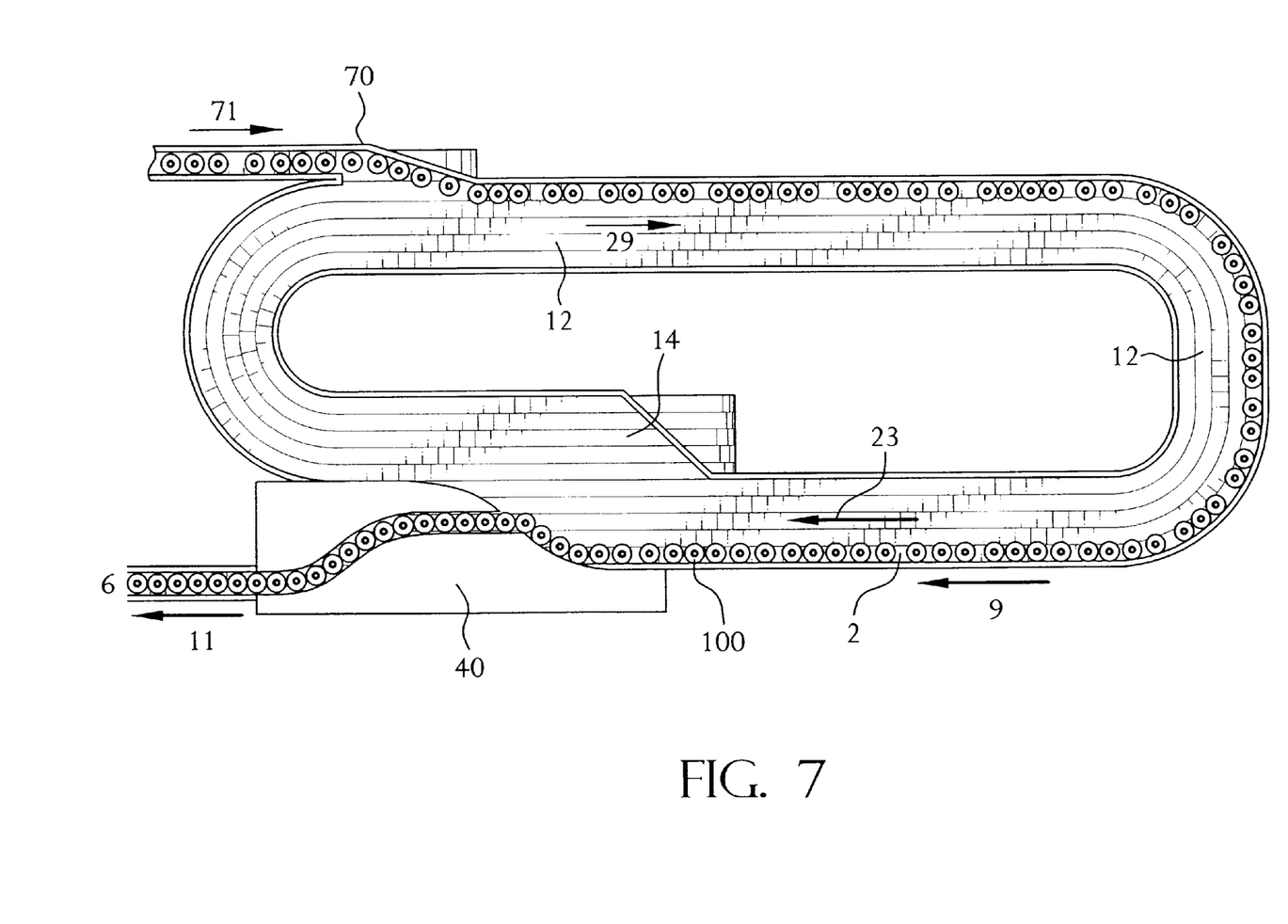
FIG. 7 is a top view of the product conveying and accumulation system of the present invention, showing still another embodiment for normal upstream to downstream product movement.

Two separate conveyors have been discussed herein for use in conveying and accumulation system 1. However, it is contemplated that multiple conveyors may be used to receive product from upstream and/or discharge downstream. For example, FIGS. 6 and 7 show the use of separate upstream and downstream conveyor configurations. In FIG. 6, upstream product is delivered to conveyor 12 by conveyor 60 traveling in the direction designated by 61. In FIG. 7, upstream product is delivered to conveyor 12 by conveyor 70 traveling in the direction designated by 71. It is contemplated that other conveyor configurations also can be employed with the conveying and accumulator system 1 of this invention, depending on facility space configurations and restrictions and product need. For instance, multiple product input conveyors may be used in the same system, the size of the system can be customized, etc.

Figure 8:
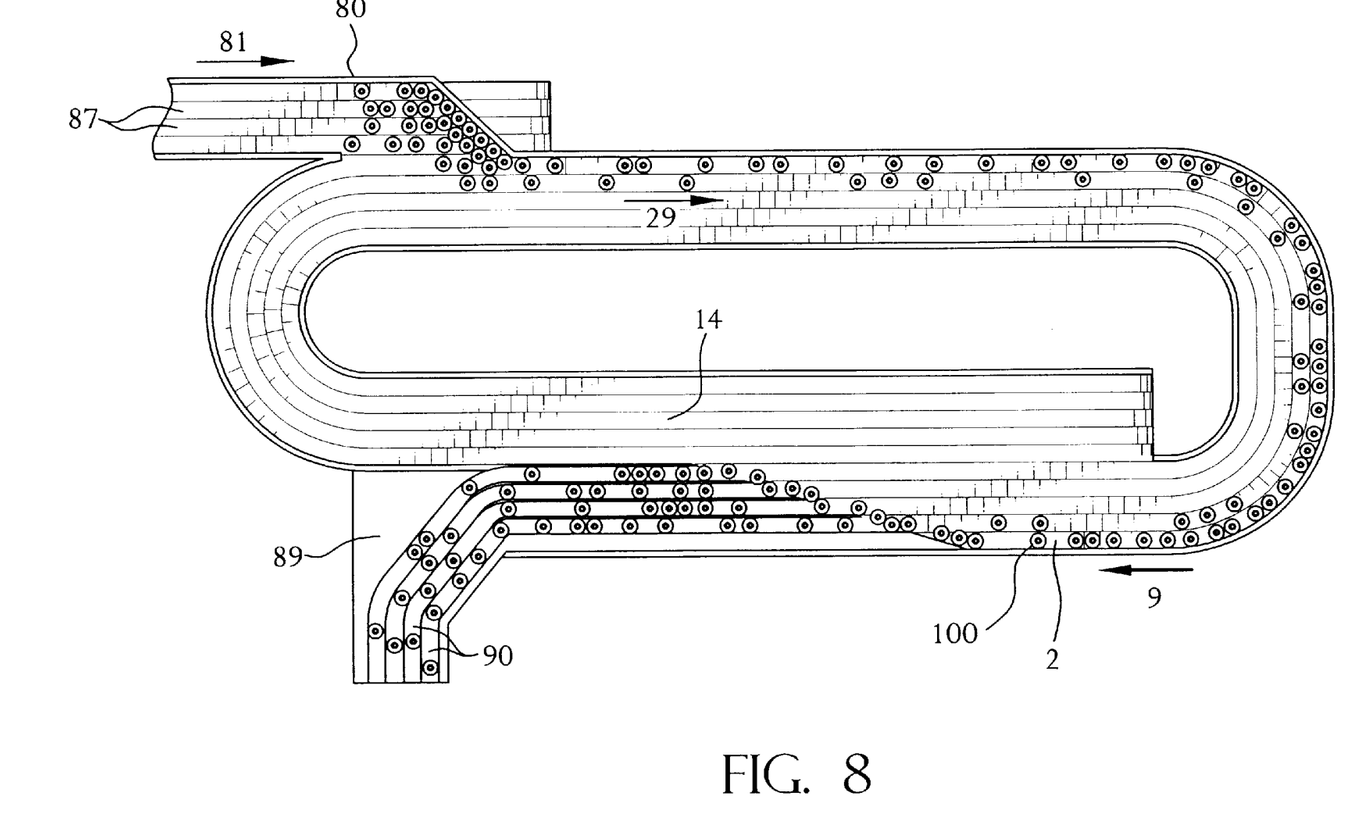
FIG. 8 is a top view of the produce conveying and accumulation system of the present invention, showing still another embodiment for normal upstream to downstream product movement.

In fact an advantage of conveying and accumulation system 1 is that it allows for flexibility in the feeding and discharging of product. For instance, conveyor 80, in FIG. 8, moving in direction 81, provides product in multiple rows 87, either aligned or in nested configuration. Similarly, products can be discharged to the conveyor, en masse or in divided rows 90, depending on the configuration of guide 89.

Finally, the configurations of surfaces 48 and 50 of guide 40, as shown, may optimally be used for certain designated products. However, there may be other novel guide surface configurations which are unique to and work best for individual products. The herein application does not contemplate all surface configurations which may be used.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

We claim:

1. A product conveying and accumulation system, said system comprising:
   (a) first conveying means for the movement of products from an upstream destination to a destination downstream of the system;
   (b) second conveying means for receiving products from the first conveying means, for accumulation and movement of products on and around the second conveying means and for delivery of products to the first conveying means for movement to the downstream destination, said second conveying means solely comprising a single, continuous looped path, curvilinear shaped conveyor, the conveyor path being substantially located in the same transverse plane as the first conveyor means, at least one section of the second conveying means being in substantial adjacent alignment with at least one section of the first conveying means, both conveying means, at all times when in adjacent alignment, moving in the same direction; and
   (c) guide means for directing products on the first conveying means to the downstream destination and for directing products for accumulation to and onto the second conveying means.

2. The product conveying and accumulation system as in claim 1 in which the guide means is configured to direct products for accumulation to and onto the second conveying means when there is a stoppage or slowdown in the rate of the movement of products to the downstream destination.

3. The product conveying and accumulation system as in claim 1 in which the first and second conveying means are configured such that products accumulate on the second conveying means when there is a stoppage or slowdown in the rate of the movement of products to the downstream destination.

4. The product conveying and accumulation system as in claim 1 in which the first and second conveying means are configured such that products accumulate on the second conveying means when there is a stoppage or slowdown in the rate of the movement of products to the downstream destination, and when movement of products to the downstream destination is resumed, products initially placed on the first conveying means and accumulated products are redirected to the first conveying means for movement to the downstream destination.

5. The product conveying and accumulation system as in claim 1 in which the guide means are configured to direct products on the first conveying means to the downstream destination and for directing products for accumulation to and onto the second conveying means while at all times maintaining the products in their upright positions.

6. The product conveying and accumulation system as in claim 1 in which the first conveying means comprises a single conveyor.

7. The product conveying and accumulation system as in claim 1 in which the first and second conveying means move at substantially the same speeds.

8. The product conveying and accumulation system as in claim 1 in which the first and second conveying means move at substantially similar speeds.

9. A product conveying and accumulation system, said system comprising:
   (a) first conveying means for the movement of products from an upstream destination to a destination downstream of the system;
   (b) second conveying means solely comprising a single, continuous looped path curvilinear shaped conveyor, the conveyor path being substantially located in the same transverse plane as the first conveyor means for the accumulation of products on and around the path and for the movement of products on and around the path to the first conveying means, said second conveying means at all times being aligned substantially adjacent to the first conveying means for contiguous movement in the same direction as the first conveying means at the adjacent alignment; and
   (c) guide means for directing product on the first conveying means to the downstream destination and for directing product for accumulation to and onto the second conveying means.

10. The product conveying and accumulation system as in claim 9 in which the first and second conveying means are in mated engagement at the adjacent alignment.

11. The product conveying and accumulation system as in claim 9 in which the guide means are configured to direct products on the first conveying means to the downstream destination and for directing products for accumulation to and onto the second conveying means while at all times maintaining the products in their upright positions.

12. The product conveying and accumulation system as in claim 9 in which the first conveying means comprises multiple conveyors.

13. The product conveying and accumulation system as in claim 9 in which the first and second conveying means move at substantially the same speeds.

14. The produce conveying and accumulation system as in claim 9 in which the first and second conveying means move at substantially similar speeds.

15. The product conveying and accumulation system as in claim 9 in which the guide means is configured to direct products for accumulation to and onto the second conveying means when there is a stoppage or slowdown in the rate of the movement of products to the downstream destination.

16. The product conveying and accumulation system as in claim 9 in which the first and second conveying means are configured such that products accumulate on the second conveying means when there is a stoppage or slowdown in the rate of the movement of products to the downstream destination.

17. The product conveying and accumulation system as in claim 9 in which the first and second conveying means are configured such that products accumulate on the second conveying means when there is a stoppage or slowdown in the rate of the movement of products to the downstream destination, and when movement of products to the downstream destination is resumed, products initially placed on the first conveying means and accumulated products are redirected to the first conveying means for movement to the downstream destination.

18. A product conveying and accumulation system, said system comprising:
   (a) at least one first conveyor for the movement of products from an upstream destination to a destination downstream of the system; and
   (b) second conveyor means solely comprising a single, continuous looped path, curvilinear shaped conveyor, the conveyor path being substantially located in the same transverse plane as the first conveyor means for the accumulation of products on and around the path and for the movement of products on and around the path to the first conveyor, said second conveyor at all times being aligned substantially adjacent to the first conveyor for contiguous movement in the same direction as the first conveyor at the adjacent alignment; and
   (c) a product movement guide configured to direct product onto the first conveyor towards the downstream destination and to direct product for accumulation to and onto the second conveyor.

19. The product conveying and accumulation system as in claim 18 in which the first and second conveyor means are in mated engagement at the adjacent alignment.

20. The product conveying and accumulation system as in claim 18 in which the guide means are configured to direct products on the first conveyor means to the downstream destination and for directing products for accumulation to and onto the second conveyor means while at all times maintaining the products in their upright positions.

21. The product conveying and accumulation system as in claim 18 in which at least one conveyor provides movement of product from an upstream destination to the second conveyor and a separate conveyor provides movement of product from the second conveyor to a downstream destination.

22. The product conveying and accumulation system as in claim 18 in which the first and second conveyors move at substantially the same speeds.

23. The product conveying and accumulation system as in claim 18 in which the first and second conveyors move at substantially similar speeds.

24. A product conveying and accumulation system, said system comprising:
   (a) first conveying means traveling at a predetermined speed for the movement of products from an upstream destination to a destination downstream of the system;
   (b) a second conveying means for the movement and accumulation of products, said second conveying means solely comprising a single, continuous looped path, curvilinear shaped conveyor, the conveyor path being substantially located in the same transverse plane as the first conveyor means and having a product movement section and a designated product accumulation section, the second conveying means moving products on and around the path to the first conveying means and being aligned substantially adjacent to the first conveying means for contiguous movement in the same direction as the first conveying means at the adjacent alignment; and
   (c) guide means for directing products on the first conveying means to the downstream destination and for directing products for movement and accumulation to and onto the path and the product accumulator section of the second conveying means.

25. The product conveying and accumulation system as in claim 24 in which the guide means is configured to direct products for accumulation to and onto the second conveying means when there is a stoppage or slowdown in the rate of the movement of products to the downstream destination.

26. The product conveying and accumulation system as in claim 24 in which the first and second conveying means are configured such that products accumulate on the second conveying means when there is a stoppage or slowdown in the rate of the movement of products to the downstream destination.

27. The product conveying and accumulation system as in claim 24 in which the first and second conveying means are configured such that products accumulate on the second conveying means when there is a stoppage or slowdown in the rate of the movement of products to the downstream destination, and when movement of products to the downstream destination is resumed, products initially placed on the first conveying means and accumulated products are redirected to the first conveying means for movement to the downstream destination.

28. The product conveying and accumulation system as in claim 24 in which the first and second conveying means are in mated engagement at the adjacent alignment.

29. The product conveying and accumulation system as in claim 24 in which the guide means are configured to direct products on the first conveying means to the downstream destination and for directing products for accumulation to and onto the second conveying means while at all times maintaining the products in their upright positions.

30. The product conveying and accumulation system as in claim 24 in which the first and second conveying means move at substantially the same speeds.

31. The product conveying and accumulation system as in claim 24 in which the first and second conveying means move at substantially similar speeds.

32. A method of transporting and accumulating products by means of a multiple conveyor system, said method comprising the steps of:
   placing products on a first conveyor system;
   moving the first conveyor system at a pre-determined speed to transport the products to a designated destination;
   providing a second conveyor system solely comprising a single, continuous looped path, curvilinear shaped conveyor, the conveyor path being substantially located in the same transverse plane as the first conveyor means,
   aligning the second conveyor system substantially adjacent to and contiguous with the first conveyor system;
   moving the second conveyor system at a predetermined speed in tandem with the first conveyor system;
   moving the second conveyor system in the same direction as the first conveyor system at the adjacent alignment;
   moving products from the first conveyor system onto the second conveyor system at the adjacent alignment;
   moving products received from the first conveyor system around substantially the entire length of the continuous looped path of the conveyor;
   stopping the transport of products to said destination;
   accumulating products on the second conveyor system by continuing the movement of the first and second conveyor systems;
   resuming the transport of products from said first and second conveyor systems to said designated destination.

33. The method of claim 32 comprising the further step of providing a guide means to direct the transport of products to the second conveyor system and the designated destination.

34. The method of claim 32 wherein the step of resuming the transport of products includes transporting products placed from the first conveyor system and the second conveyor system to the designated destination.

35. The method as in claim 32 comprising the further step of maintaining, at all times, the products in their upright positions during all transporting and accumulation steps.

36. The method as in claim 32 comprising the further step of moving the first conveyor and the second conveyor at substantially similar predetermined speeds.

37. The method as in claim 32 comprising the further step of moving the first conveyor and the second conveyor at substantially the same speeds.

* * * * *

UNITED STATES PATENT AND TRADEMARK OFFICE
CERTIFICATE OF CORRECTION

PATENT NO. : 6,575,287 B2
DATED : June 10, 2003
INVENTOR(S) : Mark C. Garvey and William J. Fox It is certified that error appears in the above-identified patent and that said Letters Patent is hereby corrected as shown below:

<u>Title page,</u>
Item [73], Assignee: should read -- Garvey Corporation of Blue Anchor, New Jersey --.

Signed and Sealed this

Thirtieth Day of September, 2003

JAMES E. ROGAN
*Director of the United States Patent and Trademark Office*